United States Patent
Liu et al.

(10) Patent No.: US 11,803,043 B2
(45) Date of Patent: Oct. 31, 2023

(54) SYSTEM AND APPARATUS FOR DYNAMICALLY SHAPED FOCAL SURFACE WITH A SCANNING MICROSCOPE

(71) Applicant: University of Washington, Seattle, WA (US)

(72) Inventors: Jonathan T. C. Liu, Seattle, WA (US); Lingpeng Wei, Seattle, WA (US); Chengbo Yin, Seattle, WA (US)

(73) Assignee: University of Washington, Seattle, WA (US)

( * ) Notice: Subject to any disclaimer, the term of this patent is extended or adjusted under 35 U.S.C. 154(b) by 331 days.

(21) Appl. No.: 17/122,697

(22) Filed: Dec. 15, 2020

(65) Prior Publication Data

US 2021/0181490 A1 Jun. 17, 2021

Related U.S. Application Data

(60) Provisional application No. 62/949,316, filed on Dec. 17, 2019.

(51) Int. Cl.
*G02B 21/00* (2006.01)
(52) U.S. Cl.
CPC ....... *G02B 21/0048* (2013.01); *G02B 21/008* (2013.01); *G02B 21/0032* (2013.01)
(58) Field of Classification Search
CPC ............ G02B 21/0048; G02B 21/0032; G02B 21/008; G02B 7/102; G02B 7/16;
(Continued)

(56) References Cited

U.S. PATENT DOCUMENTS 6,134,002 A * 10/2000 Stimson ................ G01J 3/2803
 359/368
6,351,325 B1 2/2002 Mandella et al.
(Continued)

FOREIGN PATENT DOCUMENTS

CN 102253486 A 11/2011
CN 105167736 A 12/2015
(Continued)

OTHER PUBLICATIONS

Arrasmith, Christopher L. et al., "MEMS-based handheld confocal microscope for in-vivo skin imaging", Electrical and Computer Engineering Department, Montana State University 2010 Optical Society of America, Feb. 11, 2010, pp. 1-15.
(Continued)

*Primary Examiner* — Mustak Choudhury
(74) *Attorney, Agent, or Firm* — Dorsey & Whitney LLP (57) ABSTRACT

Apparatuses, systems, and methods for dynamically shaped focal surface with a scanning microscope. A microscope (e.g., a scanning confocal microscope) may use a scanning element to scan an illumination beam to generate a focal region. The scanning element may include multiple degrees of freedom, such as rotation and translation along orthogonal axes. For example, if the illumination beam is a line focus, rotation along a first axis and translation along a second orthogonal axis may sweep the line focus across a focal surface which is substantially flat and normal to the second axis. In some embodiments, the microscope may be a dual-axis handheld microscope, where a single objective in a handheld housing is used to both direct the scanned illumination beam and receive the collected light.

29 Claims, 6 Drawing Sheets

(58) Field of Classification Search
CPC . G02B 7/20; G02B 7/22; G02B 7/282; G02B 9/00; G02B 9/64; G02B 13/14; G02B 15/143; G02B 15/144111; G02B 15/20; G02B 27/0012; G02B 27/0018; G02B 27/0062; G02B 27/0087; G02B 27/02; G02B 27/0983; G02B 27/12; G02B 27/28; G02B 27/646

See application file for complete search history.

(56) References Cited

U.S. PATENT DOCUMENTS

| | | | |
|---|---|---|---|
| 6,369,928 | B1 | 4/2002 | Mandella et al. |
| 6,441,356 | B1 | 8/2002 | Mandella et al. |
| 6,713,742 | B2 | 3/2004 | Mandella et al. |
| 7,194,118 | B1 | 3/2007 | Harris et al. |
| 2010/0033788 | A1 | 2/2010 | Xie et al. |
| 2011/0090332 | A1 | 4/2011 | Hing |
| 2011/0125029 | A1 | 5/2011 | Wang et al. |
| 2012/0140302 | A1 | 6/2012 | Xie et al. |
| 2012/0170088 | A1 | 7/2012 | Opris et al. |
| 2013/0236060 | A1* | 9/2013 | Suzuki .............. G06K 9/628 382/103 |
| 2014/0268318 | A1 | 9/2014 | Mandella et al. |
| 2018/0263482 | A1* | 9/2018 | Guan ................. F21V 14/04 |
| 2018/0353960 | A1* | 12/2018 | Dimov ............... H01S 5/18388 |
| 2019/0187461 | A1* | 6/2019 | Dresser ............. G02B 26/128 |

FOREIGN PATENT DOCUMENTS

| | | |
|---|---|---|
| JP | 2006133499 A | 5/2006 |
| TW | 200624895 A | 7/2006 |
| WO | 2004066016 A1 | 8/2004 |

OTHER PUBLICATIONS

Carlson, Kristen et al., "In Vivo Fiber-Optic Confocal Reflectance Microscope With an Injection-Molded Plastic Miniature Objective Lens", Applied Optics; vol. 44, No. 10 2005 Optical Society of America, Apr. 1, 2005, pp. 1-6.

Chen, Ye et al., "Assessing the Tissue-Imaging Performance of Confocal Microscope Architectures via Monte Carlo Simulations", Department of Biomedical Engineering, Stony Brook University (SUNY) vol. 37, No. 21 | Optics Letters 2012 Optical Society of America, Oct. 26, 2012, pp. 1-3.

Chen, Ye et al., "Video-Rate in Vivo Fluorescence Imaging with a Line-Scanned Dual-Axis Confocal Microscope", Journal of Biomedical Optics University of Washington, Department of Mechanical Engineering vol. 20(10), https://www.spiedigitallibrary.org/journals/journal-of-biomedical-optics?SSO=1, Oct. 2015, pp. 1-8.

Duan, Xiyu et al., "Visualizing Epithelial Expression of EGFR in Vivo with Distal Scanning Side-Viewing Confocal Endomicroscopy", Scientific Reports https://www.nature.com/srep/, DOI: 10.1038/srep37315, Nov. 22, 2016, pp. 1-11.

Engelbreacht, Christopher J. et al., "Ultra-Compact Fiber-Optic Two-Photon Microscope for Functional Fluorescence Imaging in Vivo", Dept. of Neurophysiology, Brain Research Institute, University of Zurich Dept, of Mechanical Engineering and Human Photonics Laboratory vol. 16, No. 8 | Optics Express 2008 Optical Society of America, Apr. 4, 2008, pp. 1-9.

Ford, Tim et al., "Fast Optically Sectioned Fluorescence HiLo Endomicroscopy", Journal of Biomedical Optics Boston University, Department of Biomedical Engineering vol. 17(2), Feb. 2012, pp. 1-8.

Han, Jae-Ho et al., "Depixelation of Coherent Fiber Bundle Endoscopy Based on Learning Patterns of Image Prior", Department of Brain and Cognitive Engineering, Korea University National Institute of Advanced Industrial Science and Technology Optics Letters / vol. 36, No. 16, Doc. ID 148141 2011 Optical Society of America, Aug. 12, 2011, pp. 1-3.

Hoy, Christopher L. et al., "Miniaturized Probe For Femtosecond Laser Microsurgery and Two-Photon Imaging", Department of Mechanical Engineering, The University of Texas at Austin vol. 16, No. 13 / Optics Express 2008 Optical Society of America, Jun. 20, 2008, pp. 1-10.

Jabbour, Joey, "Clinical Reflectance Confocal Microscope For Imaging of Oral Cancer", Office of Graduate and Professional Studies of Texas A&M University, Aug. 2014, pp. 1-113.

Kiesslich, Ralf et al., "Confocal Laser Endoscopy for Diagnosing Intraepithelial Neoplasias and Colorectal Cancer In Vivo", Rapid Communication vol. 127, No. 3, 2004, pp. 706-713.

Kim, Donggyu et al., "Toward a Miniature Endomicroscope Pixelation-Free and Diffraction-Limited Imaging Through a Fiber Bundle", Department of Physics, Korea University vol. 39, No. 7 | Optics Letters 2014 Optical Society of America, Doc. ID 202598, Mar. 24, 2014, pp. 1921-1924.

Kumar, Karthik et al., "Fast 3D in Vivo Swept-Source Optical Coherence Tomography Using a Two-Axis MEMS Scanning Micromirror", Journal of Optics A: Pure and Applied Optics Department of Electrical and Computer Engineering, University of Texas, https://iopscience.iop.org/article/10.1088/1464-4258/10/4/044013, Apr. 3, 2008, pp. 1-8.

Kumar, Karthik et al., "Handheld Histology-Equivalent Sectioning Laster-Scanning Confocal Optical Microscope for Interventional Imaging", Biomed Microdevices Department of Electrical and Computer Engineering, DOI 10.1007/s 10544-009-9377-6 Springer Science+Business Media, LLC, Dec. 10, 2011, pp. 223-233.

Kyrish, Matthew et al., "Needle-Based Fluorescence Endomicroscopy via Structured Illumination With a Plastic Achromatic Objective", Journal of Biomedical Optics | vol. 18(9) Rice University, Department of Bioengineering, Septemebr 3, 2013, pp. 1-8.

Lee, Cheon-Yang et al., "Elimination of Honeycomb Patterns in Fiber Bundle Imaging by a Superimposition Method", Department of Brain and Cognitive Engineering vol. 38, No. 12 | Optics Letters 2013 Optical Society of America, https://www.osapublishing.org/ol/abstract.cfm?uri=ol-38-12-2023, Jun. 3, 2013, pp. 2023-2025.

Li, Haijun et al., "2D Resonant Microscanner For Dual Axes Confocal Fluorescence Endomicroscope", Department of Internal Medicine, School of Medicine, University of Michigan, Jan. 19, 2016, pp. 805-808.

Li, Xingde et al., "Imaging Needle for Optical Coherence Tomography", Department of Electrical Engineering and Computer Science and Research Laboratory of Electronics Optics Letters | vol. 25, No. 20, 2000 Optical Society of America, Apr. 2000, pp. 1520-1522.

Liu, Jonathan T. et al., "Micromirror-scanned dual-axis confocal microscope utilizing a gradient-index relay lens for image guidance during brain surgery", Journal of Biomedical Optics 15(2), 026029, Mar./Apr. 2010, 1-5.

Liu, Jonathan T. et al., "Dual-Axes Confocal Reflectance Microscope For Distinguishing Colonic Neoplasia", Stanford University, Ginzton Laboratory NIH Public Access | J Biomed Opt., Dec. 3, 2007, pp. 1-21.

Liu, Lin et al., "MEMS-Based 3D Confocal Scanning Microendoscope Using MEMS Scanners for Both Lateral and Axial Scan", Department of Electrical & Computer Engineering, University of Florida Sensors and Actuators: vol. 215 | ScienceDirect, https://doi.org/10.1016/j.sna.2013.09.035, Oct. 23, 2013, pp. 89-95.

Liu, Lin et al., "MEMS-based 3D confocal scanning microendoscope using MEMSscanners for both lateral and axial scan", Sensors and Actuators A 215, 2014, 89-95.

Liu, Tianbo et al., "ARTICLE Open Access MEMS-in-the-lens architecture for a miniature high-NA laser scanning microscope", Light: Science & Applications (2019) 8:59, Jun. 26, 2019, 1-11.

Liu, Tianbo et al., "MEMS 3D Scan Mirror with SU-8 Membrane and Flexures for High NA Microscopy", Department of Electrical and Computer Engineering, Montana State University J Microelectromech Syst.| 27(4), doi: 10.1109/JMEMS.2018.2845375., Aug. 26, 2019, pp. 719-729.

Loewke, Nathan O. et al., "Software-Based Phase Control, Video-Rate Imaging, and Real-Time Mosaicing With a Lissajous-Scanned Confocal Microscope", IEEE Transactions On Medical Imaging, vol. 39, No. 4, Apr. 2020, 1127-1137.

(56) References Cited

OTHER PUBLICATIONS

Myaing, Mon T. et al., "Fiber-optic scanning two-photon fluorescence endoscope", Optics Letters / vol. 31, No. 8, Apr. 15, 2006, 1076-1078.

Olsovsky, Cory et al., "Handheld tunable focus confocal microscope utilizing a double-clad fiber coupler for in vivo imaging of oral epithelium", Journal of Biomedical Optics 22(5), 056008, May 2017, 1-8.

Piyawattanametha, Wibool et al., "3-D Near-Infrared Fluorescence Imaging Using an MEMS-Based Miniature Dual-Axis Confocal Microscope", IEEE Journal of Selected Topics in Quantum Electronics, 2009, 1-7.

Piyawattanametha, Wibool, "Image Mosaicing and Realtime Imaging With Mems Based Handheld Confocal Microscope", 2014 International Computer Science and Engineering Conference (ICSEC), 2014, 140-143.

Piyawattanametha, Wibool et al., "In vivo near-infrared dual-axis confocal microendoscopy in the human lower gastrointestinal tract", Journal of Biomedical Optics 17(2), 021102, Feb. 2012, 1-5.

Piyawattanametha, Wibool et al., "MEMS-Based Dual-Axes Confocal Microendoscopy", IEEE Journal of Selected Topics in Quantum Electronics, vol. 16, No. 4, Jul./Aug. 2010, 804-814.

Ra, Hyejun et al., "In Vivo Imaging of Human and Mouse Skin with a Handheld Dual-Axis Confocal Fluorescence Microscope", Journal of Investigative Dermatology (2011) 131, Dec. 30, 2010, 1061-1066.

Ra, Hyejun et al., "Two-Dimensional MEMS Scanner for Dual-Axes Confocal Microscopy", Journal of Microelectromechanical Systems, vol. 16, No. 4, Aug. 2007, 969-976.

Seibel, Eric J. et al., "Scanning Single Fiber Endoscopy: A new platform technology for integrated laser imaging, diagnosis, and future therapies", Gastrointest Endosc Clin N Am. Jul. 2008; 18(3):, Jul. 2008, 467-468.

Tanbakuchi, Anthony A. et al., "Clinical confocal microlaparoscope for real-time in vivo optical biopsies", Journal of Biomedical Optics 14(4), 044030, Jul./Aug. 2009, 1-12.

Thevenaz, Philippe et al., "User-Friendly Semiautomated Assembly of Accurate Image Mosaics in Microscopy", Microscopy Research and Technique 70, 2007, 135-146.

Walters, Craig T., "Flat-field postobjective polygon scanner", Applied Optics / vol. 34, No. 13, May 1, 1995, 2220-2225.

Wang, D. et al., "Comparison of line-scanned and point-scanned dual-axis confocal microscope performance", Optics Letters / vol. 38, No. 24, Dec. 15, 2013, 5280-5283.

Wang, Thomas D. et al., "Dual-axis confocal microscope for high-resolution in vivo imaging", Opt Lett. Mar. 15, 2003; 28(6), Mar. 15, 2003, 414-416.

Wang, Thomas D. et al., "Functional Imaging of Colonic Mucosa With a Fibered Confocal Microscope for Real-Time In Vivo Pathology", Clinical Gastroenterology and Hepatology 2007;5:, Nov. 2007, 1300-1305.

Wei, Linpeng et al., "Handheld line-scanned dual-axis confocal microscope with pistoned MEMS actuation for flat-field fluorescence imaging", Optics Letters; vol. 44, No. 3, Feb. 1, 2019, 671-674.

Yin, C. et al., "Miniature in vivo MEMS-based line-scanned dual-axis confocal microscope for point-of-care pathology", Biomedical Optics Express; 2016 OSA Feb. 1, 2016 | vol. 7, No. 2 | DOI:10.1364/BOE.7.000251, Jan. 5, 2016, 251-263.

Yin, Chengbo et al., "A handheld MEMS-scanned in vivo optical-sectioning microscope for early detection and surgical guidance", 2018 IEEE, Apr. 17, 2019, 1-2.

\* cited by examiner

SYSTEM AND APPARATUS FOR DYNAMICALLY SHAPED FOCAL SURFACE WITH A SCANNING MICROSCOPE

CROSS-REFERENCE TO RELATED APPLICATION(S)

This application claims the benefit under 35 § U.S.C. 119 of the earlier filing date of U.S. Provisional Application Ser. No. 62/949,316 filed Dec. 17, 2019, the entire contents of which is hereby incorporated by reference, in its entirety, for any purpose.

STATEMENT REGARDING RESEARCH & DEVELOPMENT

This invention was made with government support under Grant Nos. R01 CA175391 and R01 DE023497, awarded by the National Institutes of Health. The government has certain rights in the invention.

BACKGROUND

Microscopy may generally involve directing light onto a sample, and then imaging the sample based on light received from the sample. Confocal scanning microscopes may use an element (such as a scanning mirror) to scan a focused beam of light across a sample to illuminate a region of interest. For example, a confocal microscope may raster scan a laser beam across a focal plane to illuminate and image it. Light may be collected from the sample and passed through an aperture (e.g., a pinhole) located at a confocal plane, which may limit the out of focus light received by a detector. This may generally be useful in situations where there is a desire to image a focal plane at or below the surface of a thick tissue specimen. The scanning may be achieved by rapidly rotating a reflective element back and forth about an axis. This rotation may introduce curvature in the focal surface imaged by the microscope. This may be undesirable, for example when trying to image thin, layered, structures or when trying to stitch multiple image frames together to form a larger mosaicked image.

SUMMARY

In at least one aspect, the present disclosure relates to an apparatus including an illumination source, a scanning module, and a detector. The illumination source provides illumination light. The scanning module scans an illumination beam based on the illumination light across a focal surface. The scanning module includes one or more scanning elements, and the one or more scanning elements rotate about a first axis and translate along a second axis. The detector receives light from the focal surface.

The one or more scanning elements may further rotate about a third axis. The focal surface may be a substantially flat field in a plane which is orthogonal to the second axis. The first axis may be orthogonal to the second axis. The scanning element and the detector may be contained by a hand-held housing.

The apparatus may also include illumination optics which may generate the illumination beam based on the illumination light. The illumination beam may have a line focus. The detector may be a linear array detector.

The one or more scanning elements may include a micro-electromechanical (MEMS) mirror. The MEMS mirror may perform the rotation about the first axis and the translation along the second axis.

The apparatus may also include a controller which may direct the scanning element to determine a shape of the focal surface. The apparatus may be a confocal microscope and the apparatus further also include a confocal aperture which may limit out of focus light received at the detector. The illumination light may include an excitation wavelength of a fluorophore, and the received light may include light emitted from the fluorophore.

In at least one aspect, the present disclosure relates to a system including a controller and a microscope. The controller includes an illumination source which generates illumination light and a scanning module controller which provides signals based on a selected shape of a focal surface. The microscope includes an illumination light path which generates an illumination light beam based on the illumination light, a collection light path, and a scanning module. The scanning module scans the illumination beam to generate the focal surface. The scanning module receives light from the focal surface and directs the received light to the collection light path. The scanning module includes one or more scanning elements which actuate based on the signals. The one or more scanning elements are rotate about a first axis and translate along a second axis.

The microscope may also include a detector which may generate an image based on the light received by the collection light path. The shape of the focal surface may be substantially flat. The shape of the focal surface may be arbitrary. The one or more scanning elements may include a micro-electromechanical system (MEMS) scanning mirror which may perform the rotation about the first axis and the translation about the second axis.

The illumination beam may have a line focus. The collection light path may include a confocal aperture. The controller may be positioned on a mobile platform. The microscope may be handheld. The one or more scanning elements may rotate about a third axis.

In at least one aspect, the present disclosure relates to a method. The method includes generating an illumination beam. The method includes scanning the illumination beam with a scanning module to generate a focal surface. The scanning module includes one or more scanning elements, and the scanning includes rotating at least one of the one or more scanning elements about a first axis and translating at least one of the one or more scanning elements along a second axis. The method includes collecting light from the local surface. The method includes generating an image based on the collected light.

The scanning module may include a micro-electromechanical system (MEMS) mirror which performs the rotation about the first axis and the translation about the second axis.

The method may also include collecting the light from the focal surface through the scanning module. The method may also include positioning a hand-held unit including the scanning module near a sample. The method may also include controlling the motions of the scanning module to determine a shape of the focal surface. The method may also include scanning the illumination beam to generate a local surface which is substantially flat.

Generating the illumination beam may include focusing illumination light into a line focus. The scanning further may also include rotating at least one of the one or more scanning elements about a third axis.

DETAILED DESCRIPTION

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

A scanning confocal microscope may include an illumination beam which is swept across a focal region of a sample. The shape of the illumination beam as well as the path across which the beam is swept may determine the size and shape of the focal region. The microscope may include illumination optics which direct the illumination beam onto a scanning element, such as a scanning mirror. The scanning element may oscillate to change the position and/or angle of the illumination beam with respect to the back focal plane of an objective lens. Accordingly, the illumination beam may also change position and/or angle as it exits the front focal plane of the objective lens towards the sample. In this manner, the focus of the illumination beam may be swept across a focal surface.

The oscillation of the scanning element (e.g., rotation about one or more axes) may introduce curvature into the shape of the focal surface. While this may be corrected by changing the optical path (e.g., the components of the objective lens) to account for and correct for this curvature, such a solution may be undesirable as it may require expensive custom optics, extensive design of the microscope, extremely tight tolerances, etc. It also may lock the microscope into a single shape of focal surface. It may be desirable to use a scanning element which can adjust the shape of the focal surface as needed.

The present disclosure is directed to a system and apparatus for dynamically shaped focal surfaces with a scanning microscope. The microscope may include a scanning module which includes one or more scanning elements which perform rotation about one or more axes, and translation along one or more axes. The rotation and translation may be distributed among multiple scanning elements (e.g., an element for translation and an element for translation) or may be combined into a scanning element with multiple degrees of freedom. For example, the scanning module may include a scanning mirror which can rotate about the x and y axes, and piston back and forth along a z axis. A controller may operate the scanning module to change the shape of the focal surface. For example, the translation along the z axis may be coordinated with rotation about the x and y axis to scan an illumination beam across a focal surface which is substantially flat (e.g., planar). Other shapes of the focal surface may be achieved by changing the pattern of rotation/translation instructed by the controller. The translation may also be useful in other situations, such as, for example, adjusting the depth of the focal surface (e.g., to change a level of the focal region within a sample).

One example embodiment using such a scanning element may be a handheld line-scanned dual-axis confocal microscope. The illumination optics may generate an illumination beam which is line (e.g., elongated in an x-axis). The scanning module may include a single scanning element which is a micro-electromechanical system (MEMS) mirror which may scan the line back and forth (e.g., in a y-axis) and also translate along an orthogonal axis (e.g., along the z-axis). The scanning element may be directed to generate a focal surface which is of arbitrary shape. For example, the scanning element may be directed to generate a focal surface which is substantially flat (e.g., along the x-y plane). The microscope includes a single objective lens, which may be used both to direct the scanned imaging beam onto the sample and also receive light from the sample. The scanning module also receives collected light from the focal region, and may descan the collected light and direct the descanned collected light onto a detector. Various components, such as the objective, scanning element, and/or detector may be packaged together into a hand-held system. This may be useful, for example, for in vivo imaging of tissue.

Figure 1:
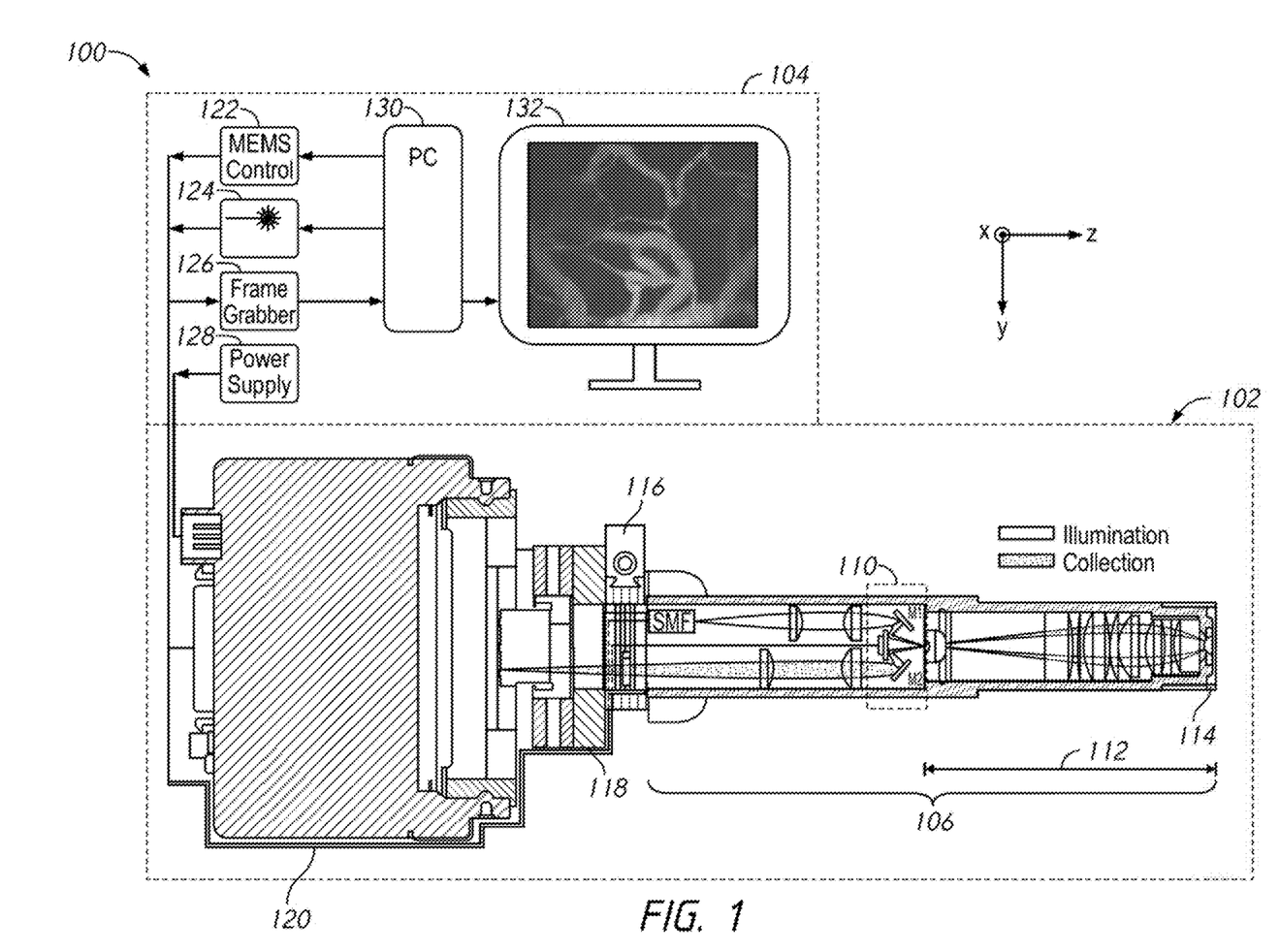
FIG. 1 is a schematic diagram of an optical system according to some embodiments of the present disclosure.

FIG. 1 is a schematic diagram of an optical system according to some embodiments of the present disclosure. The optical system 100 shows a layout of a particular example embodiment. It should be understood that details of the layout of FIG. 1 may be different in other example embodiments. For example, while the example embodiment of FIG. 1 shows a handheld microscope 102 coupled to a controller 104, other embodiments may use a controller integrated into a handheld unit, or may use a microscope which is not handheld. In some embodiments, one or more parts of the controller 104 may be omitted, and the microscope 102 may be operated manually.

The optical system 100 includes a handheld microscope 102 (e.g., an optical unit) and a base-station controller 104. The controller 104 includes an illumination source 124, which generates light that may be coupled (e.g., via an optical fiber) to the handheld microscope 102. The handheld microscope 102 includes imaging and collection optics 106, which shape and direct the illumination beam towards a focal region (e.g., a focal surface). The optics 106 include a scanning module 110, which scans the illumination beam across a back focal plane (BFP) of an objective lens 112. The objective lens includes a number of optical elements (e.g., lenses) and directs the scanned illumination beam towards a front focal plane (FFP) of the objective. The scanning of the illumination beam across the FFP may generate the focal surface. The objective 112 may also receive light from the FFP, and direct the received light through the objective 112 to the BFP and onto the scanning module 110. The scanning module 110 may direct the received light to the collection optics. For example, the scanning module 110 may descan the received light and direct the descanned light to the collection optics and detector 120. The microscope 102 may include a confocal aperture to limit out of focus light. Example details of the optics 106 are described in more detail in FIG. 2.

The handheld microscope 102 may be shaped so that it can be held by a user (e.g., in a user's hand) and manually positioned relative to a sample. For example, the sample may be a patient and the handheld microscope 102 may be used for in vivo imaging. The handheld microscope 102 may include a hand-held housing which contains the optics 106 and which is detachably coupled to the detector 120 and controller 104. For example, the handheld microscope 102 includes an adaptor 118 and a fast release 116. The adaptor 118 may be coupled to the detector 120, and the fast release connector 116 may removably couple the adaptor 118 to the housing which holds the optics 106. The adaptor 118 may, in some embodiments, be adjustable to control the positioning of the detector 120 relative to the optics 106. For example, the adaptor 118 may adjust the relative position along the x, y, and or/axis, rotation about one or more of those axes, or combinations thereof. In some embodiments, the detector 120 may be more permanently coupled to the optics 106. In some embodiments, the detector 120 may also be contained in a hand-held housing.

In some embodiments, the handheld microscope 102 may not necessarily be handheld. For example, the microscope 102 may be supported by an armature or other structure. A user may manually position the microscope 102 and/or actuators may position the microscope 102. In some embodiments, the optical system 100 may be similar to an endoscope with the controller 104 as a base station and the microscope 102 extending in a housing which may be positioned (partially or entirely) inside a subject.

The handheld microscope 102 may include an optional lens cap 114. The lens cap may be a transparent material which covers a front surface of the microscope 102. The lens cap 114 may prevent the front of the microscope 102 from coming into direct contact with the sample as the lens cap 114 may contact the sample instead. The lens cap 114 may be removable so that it can be cleaned, sterilized, etc. In some embodiments, some form of immersion fluid (e.g., a transparent fluid such as ultrasound gel) may be positioned between the front surface of the lens cap 114 and the sample to improve optical coupling into and out of the sample.

The microscope 102 may be coupled to the controller 104 by one or more physical connections (e.g., wires, optical fibers, etc.), wireless connections (e.g., blue tooth, wifi, etc.), or combinations thereof. For example, an optical fiber may couple the illumination source 124 to the handheld microscope 102, while various wires may be used to couple data to/from the detector 120, and power and control signals to various components (e.g., the scanning module 110). In some embodiments, commercial communication protocols (e.g., USB, PCIe, blue tooth, etc.), custom communication protocols or combinations thereof may be used.

The controller 104 may represent various components of the system 100 which are positioned in a base station separate from the handheld microscope 102 (although one or more of these components may be part of the handheld microscope 102 in other embodiments). In some embodiments, the controller 104 may not be handheld. The controller 104 may represent different components packaged together, or may represent separate components. In some embodiments, the controller 104 may be portable (e.g., packaged in a housing with a handle, positioned on a mobile cart, etc.). The controller 104 includes a scanning module controller 122, an illumination source 124, a detector interface 126, a power supply 128, a general purpose computer 130, and an input/output system 132.

The general purpose computer 130 may be used to coordinate the operation of one of more components of the controller 104, which in turn may operate the handheld microscope 102. In some embodiments, the computer 130 may directly operate one or more components of the microscope 102. The general purpose computer 130 may include a processor and a memory. The memory may include various instructions which may be operated by the processor. The processor may operate the instructions to carry out various operations, such as operating the microscope 102 and or capturing/analyzing data from the microscope 102. The general purpose computer 130 may be coupled to an input/output 132, which may display information to a user (e.g., via a monitor) and receive commands from a user (e.g., via a keyboard and mouse). The instructions may be used to generate a user interface, which may allow a user to control various options of the imaging process. In some embodiments, the instructions may automate various options of the imaging process.

The controller 104 includes a scanning module controller 122, such as a MEMS controller. The scanning module controller 122 may provide various signals which actuate the scanning module 110. For example, the scanning module controller 122 may provide voltages, each of which may cause a displacement or rotation of one or more scanning elements of the scanning module 110 about/along an axis. The scanning module controller 122 may vary these voltages in time to scan the illumination light. For example, a first voltage may actuate the scanning module 110 in rotation about a first axis, while a second voltage may actuate the scanning module 110 in translation along a second axis. The computer 130 may include instructions which coordinate the signals provided by the scanning module controller 122 to control the shape of the focal region.

For example, the scanning module controller 122 may generate voltages based on a particular equation (or equations), which may be chosen to cause the scanning module 110 to generate a focal surface of a desired shape. This shape may be arbitrary, and may be any shape within the physical (and optical) limits of the system (e.g., the range of motion of the scanning elements in the scanning module 110). For example, the focal surface may be flat, sloped, tilted, or curved across all or a portion of the field of view. In some embodiments, a shape of the focal surface may be chosen based on the sample to be imaged such that the focal surface lies within a structure in which imaging is desired. Since the focal surface may be generated based on signals (e.g., voltages) from the controller 104, it may be possible to alter the shape of the focal surface during imaging.

In some embodiments, it may be useful to generate a focal surface which is substantially flat (e.g., which is at a plane orthogonal to an axis of the objective 112). To generate a substantially flat focal surface, the scanning module 110 may have at least one component driven to rotate by a first voltage which is varied as a sinusoidal or triangular waveform, and at least one component driven to translate by a second voltage which is varied as a second sinusoidal or triangular wave. A focal surface may, in some embodiments, be considered substantially flat if its curvature is smaller than its depth of focus. Other waveforms may be used to produce a substantially flat focal surface, or may be used to produce other shapes of focal surface, in other embodiments.

The controller 104 includes an illumination source 124. The source 124 may be a narrow band source, such as a laser or a light emitting diode (LED) which may emit light in a narrow spectrum. In some embodiments, the light may be a broadband source (e.g., an incandescent source, an arc source) which may produce broad spectrum (e.g., white) illumination. In some embodiments, one or more portions of the illumination light may be outside of the visible range. In some embodiments, a filter (not shown) may be used as part of the illumination path to further refine the wavelength(s) of the illumination light. For example, a bandpass filter may receive broadband illumination from the source 118, and provide illumination light in a narrower spectrum. In some embodiments, the light source 103 may be a laser, and may generate collimated light.

In some embodiments, the sample imaged by the microscope 102 may be a biological sample. For example, the sample may be a tissue which includes a region of suspected disease (e.g., cancer). In some embodiments, the sample may be an in vivo tissue, and may be part of a subject (e.g., a patient). The user may position the microscope 102 along various regions of the subject to image different tissues (or different regions of the same tissue) in the subject. In some embodiments, the tissue may undergo various processing, such as optical clearance, exposure (e.g., via surgery), and/or labeling before being examined by the optical system 100. In some embodiments, examination of the tissue with the optical system 100 may be used for diagnosis, to determine treatment progress, to monitor disease progression, etc. In some embodiments, the sample may be non-biological.

In some embodiments, the illumination light may illuminate one or more structures of the sample, and the collected light may be reflected (and/or scattered) from those structures. In some embodiments, labels (e.g., stains) may be applied to the sample. In some embodiments, the imaging may be label-free. In some embodiments, the sample may include one or more types of fluorophores. The fluorophores may be intrinsic to the sample (e.g., proteins in biological samples) or may be a fluorescent label (e.g., acridine orange, eosin) applied to the sample. Some samples may include a mix of intrinsic types of fluorophores and exogenously applied fluorescent labels. Each type of fluorophore may have an excitation spectrum, which may be centered on an excitation wavelength. When a fluorophore is excited by light in the excitation spectrum, it may emit light in an emission spectrum, which maybe centered on an emission wavelength which is different than (e.g., red-shifted from) the excitation wavelength.

In some embodiments, the optical system 100 may be used to image fluorescence in the sample. The illumination source 124 may include light at a particular excitation wavelength, which may excite fluorophores in the sample. The illumination source 124 may include a broad spectrum of light which includes the excitation wavelength, or may be a narrow band centered on the excitation wavelength. In some embodiments, the light source 124 may produce a narrow spectrum of light centered on (or close to) the excitation wavelength). In some embodiments, filter(s) (not shown) may be used in the illumination optics to limit the illumination beam to wavelengths near the excitation wavelength. Once excited by the illumination sheet, the fluorophores in the sample may emit light (which may be centered on a given emission wavelength). In some embodiments, the collection path (e.g., in the optics 106) may include one or more filters which may be used to limit the light which reaches the detector 120 to wavelengths of light near the peak of the emission spectrum. In some embodiments the collection path may reject light at or near the excitation wavelength (e.g., by using a longpass filter).

The controller 104 may include a detector interface 126, such as a frame grabber, which may be used to capture data provided by the detector 120. The controller 104 may also include a power supply 128, which may provide voltage(s) to power one or more components of the handheld microscope 102. For example, the power supply 128 may power the detector 120. In some embodiments, the power supply 128 may power one or more components of the controller 104. In some embodiments, the components of the controller 104 may have independent power supplies (e.g., wall power).

The controller may present an image to a user (e.g., via the input output system 132). For example, images may be presented on a monitor, along with various options which may allow the user to control the imaging and/or save/annotate the images. In some embodiments, the system 100 may capture new images at a relatively high frame rate to allow for video/real-time imaging. For example, the system may update the images on the screen at 4, 8, 16, or 32 Hz. Higher or lower frame rates may be used in other embodiments. In some embodiments, the frame rate may be user adjustable. In some embodiments, the user may choose to capture particular frames for later review/analysis.

The microscope 102 may capture an image across a particular field of view (FOV). The field of view may represent a portion of the focal surface from which light is captured and directed onto the detector 120. In many applications, it may be desirable to capture images from an area which is larger than a single FOV. In some embodiments, this may be accomplished by having the user move the handheld microscope 102 relative to the sample. In some embodiments, the microscope 102 may include one or more controls which may be actuated to move the FOV relative to the sample without the need to reposition the microscope 102 relative to the sample.

In some embodiments, the controller 104 may mosaic several FOVs together to present an image of a larger region to a user. For example, the PC 130 may capture images of a first FOV and a second FOV, and then register those images to each other using one or more image registration algorithms. Once registered, the FOVs may be combined and presented to a user as a single image.

In some embodiments, the controller 104 may perform one or more image processing steps. For example, the PC 130 may include instructions which may be executed to remove background noise from the images. In some embodiments, the image processing may annotate the image. In some embodiments, the image processing may identify one or more regions of interest (e.g., by analyzing features of the image).

In some embodiments, the optical system 100 may be portable. For example, the controller 104 may be packaged onto a mobile platform (e.g., such as surgical cart) for ease of transportation. Accordingly, the system 100 may be transported near a subject (e.g., into a examination room) and the handheld microscope 102 may then be used to image particular regions of the subject.

In some embodiments, the microscope 102 may include a sample holder. For example, a clip or other holder may be used to attach a slide to a front end of the objective 112. In some embodiments, the microscope 102 may not be handheld, and may include a sample holder such as a 3-axis stage which supports a sample. In some embodiments, the stage may be moved by the controller 104 to capture multiple fields of view.

In some embodiments, different layouts of the microscope 102 may be used. For example, the microscope 102 may include a fiber bundle which couples light to and from a distal scanning head which may be positioned near a sample. The scanning module 110 may produce a focal surface at a proximal end of the fiber bundle (e.g., a substantially flat focal surface) which may also generate a second focal surface at the distal end of the fiber bundle. In some embodiments, one or more components of the scanning module 110 may be located at a distal end of the fiber bundle.

Figure 2:
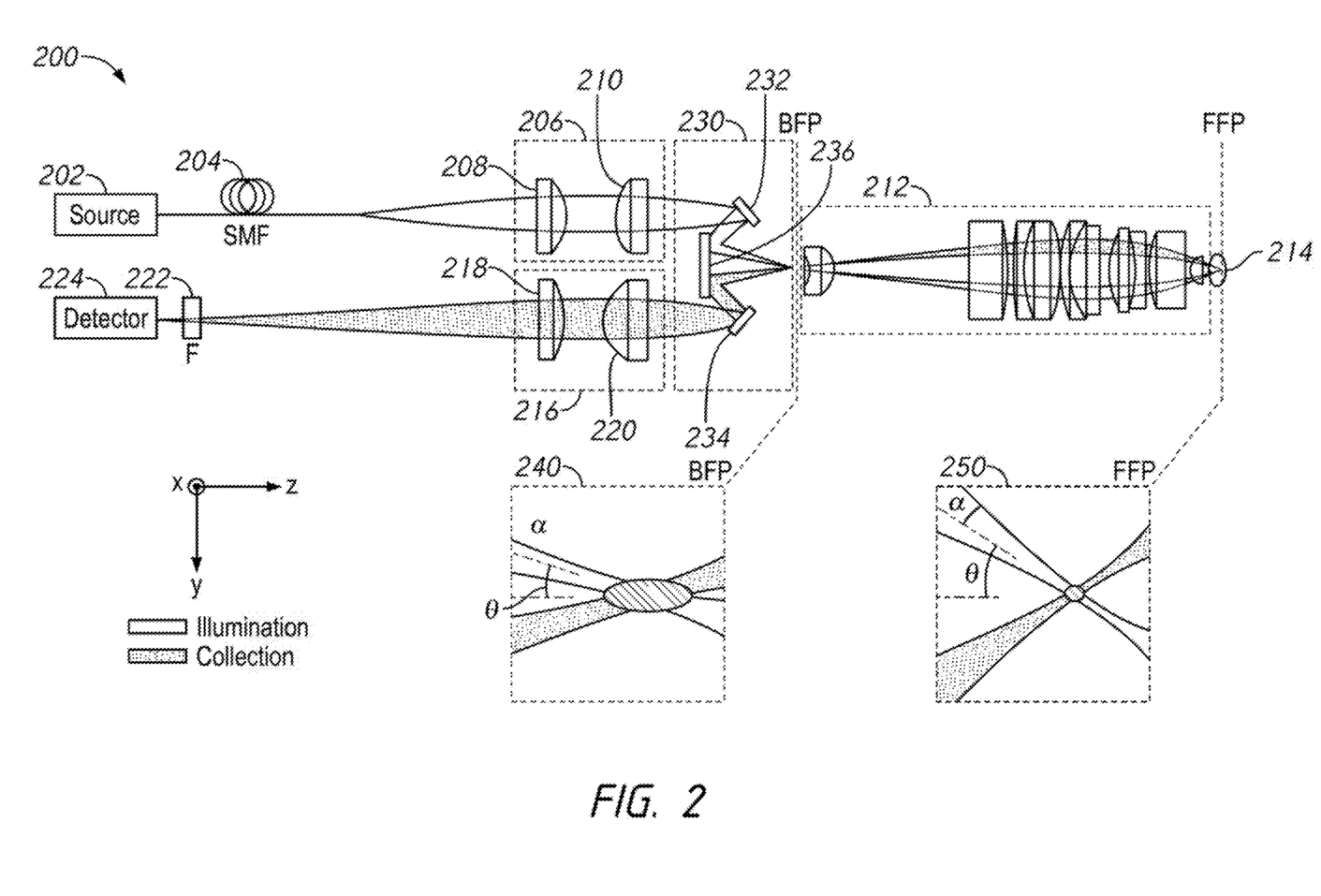
FIG. 2 is a schematic diagram of a microscope according to some embodiments of the present disclosure.

FIG. 2 is a schematic diagram of a microscope according to some embodiments of the present disclosure. The microscope 200 may, in some embodiments, represent an optical path of the optical system 100 of FIG. 1. For example the microscope 200 may represent components of the handheld microscope 102 of FIG. 1, along with certain additional components such as the light source 202 (e.g., light source 124 of FIG. 1).

The microscope 200 includes a light source 202, which produces illumination light. For example the light source 202 may be a laser, which may produce light at an excitation wavelength of a fluorophore in the sample 214. The laser may be coupled into an optional optical fiber 204, such as a single mode fiber (SMF), to illumination optics 206. The illumination optics 206 may redirect the illumination light towards the scanning module 230, and also alter one or more properties of the illumination light. For example, the illumination optics 206 may reshape the illumination light into a focused illumination beam. The scanning module 230 may scan the illumination beam across a back focal plane (BFP) of the objective 212, which may focus the scanned illumination beam to a front focal plane (FFP) of the objective. For example, the FFP may be positioned in a sample 214. The scanning of the illumination beam across the BFP may generate a focal surface at or near the FFP. Light from the sample 214 (e.g., from the focal surface) may be collected through the objective 212 to the BFP, and may be directed by the scanning module 230 through collection optics 216. The collection optics 216 may direct the collected light to a detector 224 and may alter one or more properties of the collected light (e.g., changing the magnification, filtering, etc.). An optional filter 222 may limit the light which reaches the detector 224 to certain wavelengths.

The light source 202 may generate illumination light. The example microscope 200 may be a fluorescence confocal microscope. Accordingly, the light source 202 may generate light which has a spectrum which includes an excitation wavelength of one or more target fluorophores. For example, the light source 202 may be a laser with a wavelength of about 488 nm. Other types of sources, and other wavelengths of the illumination light, may be used in other example embodiments. In some embodiments, optional filters (not shown) may be used to limit the excitation light to a spectrum centered on the excitation wavelength.

The illumination light may be coupled into the illumination optics 206 through an optional optical fiber 204. The optical fiber 204 may be useful in embodiments where it is not desirable to have the light source 202 in close proximity to the illumination optics 206. For example, in embodiments such as the handheld microscope 102 of FIG. 1, it may not be practical (e.g., due to space, weight, and/or heat issues) to place the light source 202 in the handheld unit. Accordingly, the use of a fiber 204 may allow the light source 202 to be placed at a base station, while still coupling the illumination light into the illumination optics 206. In some embodiments, the fiber 204 may be omitted, and the light source 202 may be directly coupled to the illumination optics 206.

The illumination optics 206 focus the light onto the scanning module 230, and also reshape the light into an illumination beam. The example microscope 200 is a line scan microscope, in which the illumination beam is focused to a line, which is scanned across the focal region of the FFP. For example, the illumination focal line may extend along the x-axis. Although idealized as a line, the illumination focal line may have a non-zero thickness (e.g., in the y-axis). Similarly, while idealized as a line, the illumination focal line may be cursed (e.g., due to the properties of optical elements such as lenses). The illumination focal line may be swept back and forth (e.g., along the y-axis) by the scanning module 230 to generate a local surface. Other example embodiments may use other shapes of the focus of the illumination beam and other scanning paths (e.g., a point illumination may be raster scanned in the X-Y plane, etc.).

The illumination optics 206 include a first lens 208 and a cylindrical lens 210. The first lens 208 may collimate the light from the SMF 204. For example, the first lens 208 may be a spherical lens. In some embodiments, the first lens 208 may have a focal length of about 9.0 mm. The cylindrical lens 210 may shape the light into a line focus. For example, the cylindrical lens 210 may have a focal length of about 12.0 mm. The illumination optics 206 may generate an illumination beam with a line focus (e.g., an illumination light sheet), which may have a full-width half-maximum (FWHM) length of 1.2 mm and a focusing NA of approximately 0.09. Other dimensions of illumination beam may be used in other example embodiments.

The illumination beam may be directed to the scanning module 230. The scanning module includes a MEMS scanning mirror 236 which acts as the scanning element, as well as alignment mirrors 232 and 234 to direct the illumination and collection beams (respectively) into and out of the MEMS scanning mirror 236. The alignment mirrors 232 and 234 may be tilted mirrors to redirect light to and from the mirror 236. The alignment mirrors 232 and 234 may, in some embodiments, be adjustable (e.g., either manually and/or with an actuator) and adjustments may be made to align the system. The positioning of scanning elements such as the mirror 236 may generally be referred to in reference to a neutral position of that element. The view of FIG. 2 shows a 'top-down' view of a scanning module 230 where the mirror 236 is aligned in an x-y plane. However, it should be understood that the mirror may have a neutral position where the mirror does not lie in the X-Y plane. For example, the neutral position of the mirror may be tilted and rather than rotate about the x-axis, the mirror 236 may rotate about an axis which is within the plane of the surface of the mirror 236.

The example microscope 200 is a dual-axis system, where the illumination and collection light paths share the same scanning module 230 (and objective 212). The MEMS scanning mirror 236 may be used to scan the illumination beam across a BFP of the objective 212, and also direct collected light received through the objective 212 onto the collection optics 216. The MEMS scanning mirror 236 may have multiple degrees of freedom. For example, the MEMS scanning mirror 236 may rotate about the x-axis to scan the illumination beam back and forth and may translate (e.g., piston) along the z-axis. The rotation and translation may be coordinated (e.g., by controller 104 of FIG. 1) to control the shape and/or location of the focal region. An example scanning module is discussed in more detail in FIG. 3, and an example operation of a scanning module is discussed in more detail in FIG. 4.

One example operation of the scanning module 230 may be to 'flatten' a focal region in the sample 214. The rotation of the MEMS scanning mirror 236 about the x-axis may sweep the illumination light sheet (i.e. line focus) back and forth across the focal region. However, rotation alone may cause certain parts of the mirror to be further closer to the BFP, which may lead to a curved focal surface. However, when coupled with translation along the z-axis, the MEMS scanning mirror 236 may both change angle (via rotation) to sweep the illumination beam, and the translation may cause the scanned beam focus to remain within a substantially flat focal plane near the BFP. This may lead to a 'flat' or 'planar' swept focal surface within the sample. It should be understood that while the focal surface may be described and idealized as a surface (e.g., 2D), it may have a non-zero thickness (e.g., a depth of focus) due to the limitations of optics. A substantially flat focal surface may have a curvature which is smaller than the depth of focus across the imaged area. A flat focal surface may be particularly useful in situations when one wishes to image a sample with thin flat structures (e.g., imaging thin tissue layers) or when one wishes to stitch many such images together, while slowly changing the lateral position of each image, to form a larger mosaicked image.

Other shapes of focal surface may also be used, and since the shape of the planar region is controlled by the behavior of the MEMS scanning mirror 236, additional shapes may be rapidly achieved by changing the programmed behavior of the MEMS scanning mirror 236. For example, the focal surface may be flat-sloped, curved, etc.

In an example operation where flattening of the focal region 214 is desired, the rotation of the MEMS scanning mirror 236 may be controlled by a voltage driven in a sine wave fashion. The translation of the MEMS scanning mirror 236 along the z-axis may be controlled by a voltage varied using Equation 1, below:

$$V_z = |A \sin(\omega t + \phi)| \quad (1)$$

Where $V_z$ is the driving voltage of the scanning module 110 along the z-axis (e.g., the axis of the objective 212), A is the amplitude of the translational motion along that axis, $\omega$ is the frequency of the actuation, and $\phi$ is used to synchronize the actuation along the z axis to the rotation about a different axis (e.g., the x-axis). Other waveforms may be used to control the operation of the MEMS scanning mirror 236 in other embodiments.

In some embodiments, the MEMS scanning mirror 236 may have additional degrees of freedom which may go unused in certain scanning modes. For example, the MEMS scanning mirror 236 may generally rotate about the x-axis and translate along the z-axis in a 'flat-field' scanning mode. However, the MEMS scanning mirror 236 may have additional degrees of freedom, such as the ability to also rotate about the y-axis. This may be useful in additional imaging modes. For example, if the illumination beam has a point focus, then rotation about the y-axis may be used to raster scan the illumination beam across a focal surface. Other imaging modes with additional degrees of freedom in the MEMS scanning mirror 236 may have more complicated waveforms to produce various shapes of focal surfaces.

The example microscope 200 uses a single MEMS scanning mirror 236. However, in other embodiments, multiple scanned optical elements may be used to control the operation of the scanning module 230. For example, a first mirror may have rotational freedom while a second mirror may have translational freedom. The action of the scanning mirror 236 may be distributed over any number of elements. Similarly, while the example microscope 200 has a scanning module 230 which includes mirrors, other scanning modules 230 may have other forms of scanning optics.

The objective lens 212 may focus the illumination beam onto the sample 214 at a FFP, and receive collected light from the sample 214 and direct it to the scanning module 230. The objective lens 212 may include a number of individual lenses. The objective lens may package these lenses together into a single optical element. For example, in some embodiments, the objective 212 may be a commercial objective lens. In some embodiments, the objective lens 212 may be a relay objective with a 3× magnification.

Inset 240 shows an expanded view of the illumination and collection light where they are focused at the BFP. Optical axes of the illumination and collection light paths cross at an angle $\theta$ (e.g., a half-crossing angle), while each of the light paths represents a beam with an NA represented by the angle $\alpha$. Inset 250 shows an expanded view of the illumination and collection beams where they focus at the FFP (e.g., within a sample). The angles $\theta$ and $\alpha$ are both increased by the magnification of the objective 212 and the increased index of refraction of the tissue (e.g., as compared to the air at the BFP). For example, $\alpha$ at the BFP may be about 0.09 rad and 0.20 rad at the FFP, while $\theta$ at the BFP may be about 11.0 deg and about 23.9 deg at the FFP.

The collected light may pass back through the objective 212 and across the scanning module 230. The same motion of the scanning module 230 which scans the illumination light of the target across the focal region may also descan the collected light into the collection optics 216. The collection optics 216 may focus the light on the detector 224, and may, in some embodiments, further magnify the image. The collection optics 216 includes a second lens 220 and a third lens 218. The second lens 220 may be a spherical-doublet with a focal length of about 12.0 mm, while the third lens 218 may be a spherical doublet with a focal length of about 60.00 mm. In some embodiments, an additional descanning module may be used to descan the collected light onto the collection optics 216. For example, the descanning module may include scanning elements which may be synchronized to the scanning elements of the scanning module 230.

In some embodiments, an optional filter 222 may be used to limit the light reaching the detector 224. This may be useful in fluorescence imaging, for example to prevent excitation light from reaching the detector Accordingly, a long pass filter, with a cutoff longer than the illumination wavelength may limit the illumination light reaching the detector. In the example embodiment where the illumination light is a 488 nm laser, a 495 nm long pass filter may be used.

In some embodiments, a confocal aperture, such as a confocal pinhole or slit may be used to limit out of focus light reaching the detector. The use of a confocal aperture may help to reduce the amount of undesirable background light that is detected. In some embodiments, the detector 224 may act as the confocal aperture. For example, the detector 224 may be a linear array detector, such as a CMOS linear array detector. The linear array of pixels of the detector may act as a confocal slit. The shape of the confocal aperture may be based, at least in part, on the shape of the focus of the illumination beam.

Figure 3:
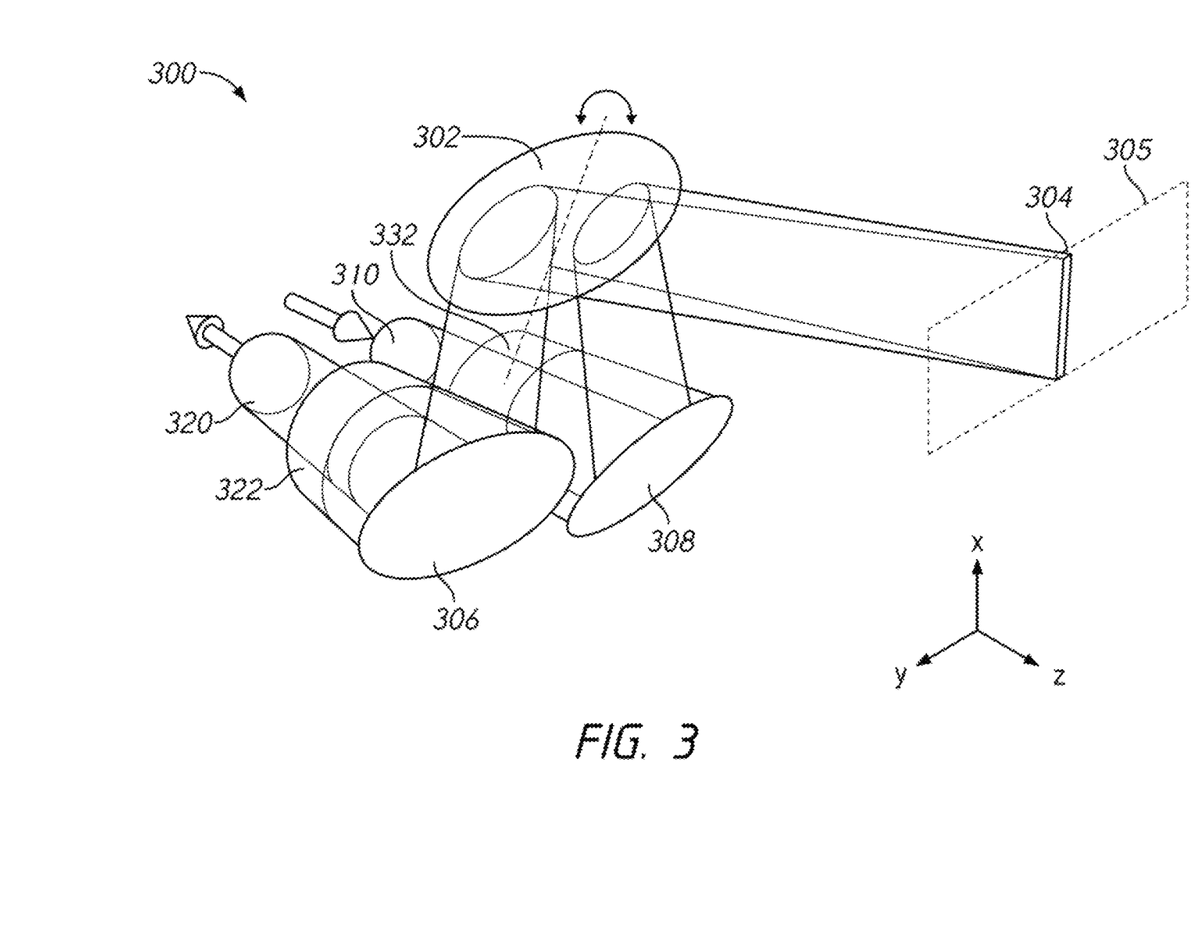
FIG. 3 is a schematic diagram of a scanning module according to some embodiments of the present disclosure.

FIG. 3 is a schematic diagram of a scanning module according to some embodiments of the present disclosure. The scanning module 300 may, in some embodiments, be included in the scanning module 230 of FIG. 2. For the sake of brevity, features and details already explained with respect to FIG. 2 may not be repeated again with respect to FIG. 3.

FIG. 3 shows a schematic diagram of a scanning module similar to the scanning module 230 of FIG. 2 where a single MEMS scanning mirror 302 is used for both scanning an illumination beam 310 and for descanning the collected light 320. In order to make the optical path more compact (e.g., so it can fit in a handheld housing), a pair of alignment mirrors 306 and 308 are used. The alignment mirror 308 directs the illumination light 310 from lens 332 (e.g., lens 210 of FIG. 2) onto the MEMS scanning mirror 302. The collected light 320 bounces off the MEMS scanning mirror 302 and off alignment mirror 306 through lens 322 (e.g., lens 220 of FIG. 2).

Unlike the flattened views of the scanning modules of FIGS. and 2, FIG. 3 shows a layout of the scanning module 300 in three dimensions. Here, rather than lie in an X-Y plane, the surface of the MEMS scanning mirror 302 is tilted. For example, the neutral position of the mirror 302 is rotated around the y-axis such that there is a non-zero angle between the surface of the mirror 302 and the x-axis. Accordingly, rather than rotate about the x-axis as previously described, the axis of rotation may lie at a tilt with respect to the x-axis (e.g., along axis lying along a centerline of the surface of the mirror 302).

The illumination light is focused to a line focus 304. The collected light is limited primarily to the signal generated at the line focus 304 by the confocal slit (e.g., the line detector). The oscillation of the MEMS scanning mirror 302 about the axis of rotation (as well as the translation of the MEMS scanning mirror along the z-axis) causes the line focus to be swept back and forth across a focal surface 305, which may be located at a FFP of the system. The amount of rotation may, in part, determine the size of the focal region 305. At a given instant, only the area at the position of line focus 304 may receive illumination light 310 and have collected light 320 collected from that line focus. However, the rapid scanning of the line focus 304 may effectively illuminate/collect from the entire focal surface 305 over time, in which an image is generated line by line.

The size and shape of the focal surface 305 may therefore be defined, in part, by the operation of the MEMS scanning mirror 302. The rotation of the mirror about the axis of rotation may move the line focus 304 back and forth (e.g., along the scanning direction, y-axis. Pistoning of the MEMS mirror 302 may move the line focus back and forth along the z-axis (e.g., to change a focal depth of the system). Rotation of the MEMS mirror 302 about the y-axis may cause the line focus to move up and down along the x-axis. These movements may be coordinated in time to achieve various shapes of the focal region 305.

In some embodiments, the MEMS scanning mirror 302 may be used to perform other operations. For example, the position of the focal surface relative to the sample may be changed. The waveforms which actuate the MEMS scanning mirror 302 may be given a DC offset, which may change the 'default' position of the focal surface. For example, a DC offset in the waveform which actuates the translation along the z axis may change a depth of the focal surface within the sample. This may be useful to change a depth of focus of the collected images.

Figure 4A:
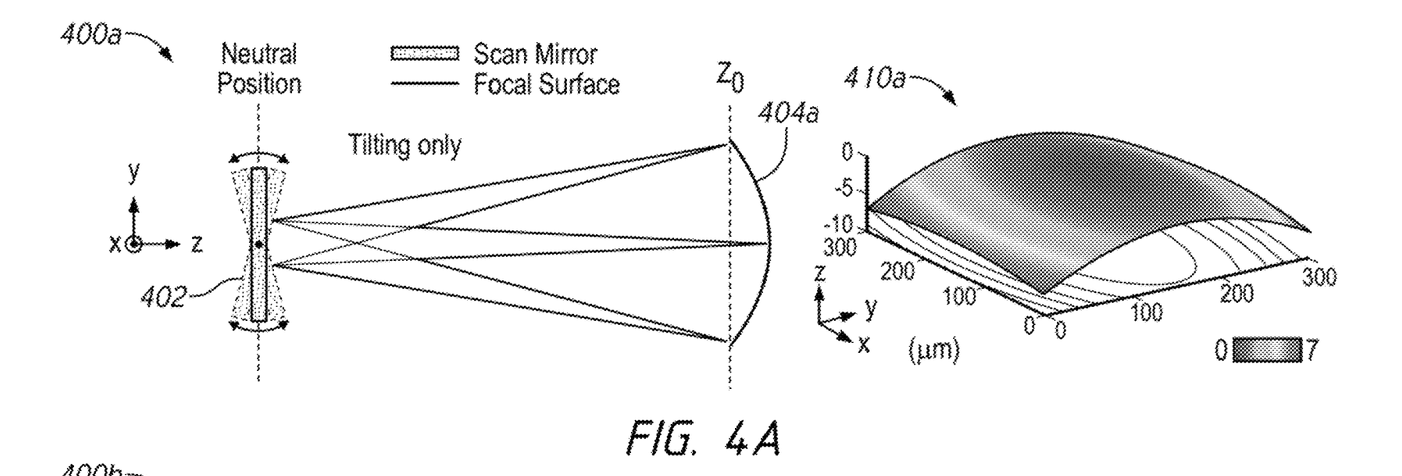
FIGS. 4A-4B are graphs depicting example operations of a scanning mirror according to some embodiments of the present disclosure.
Figure 4B:
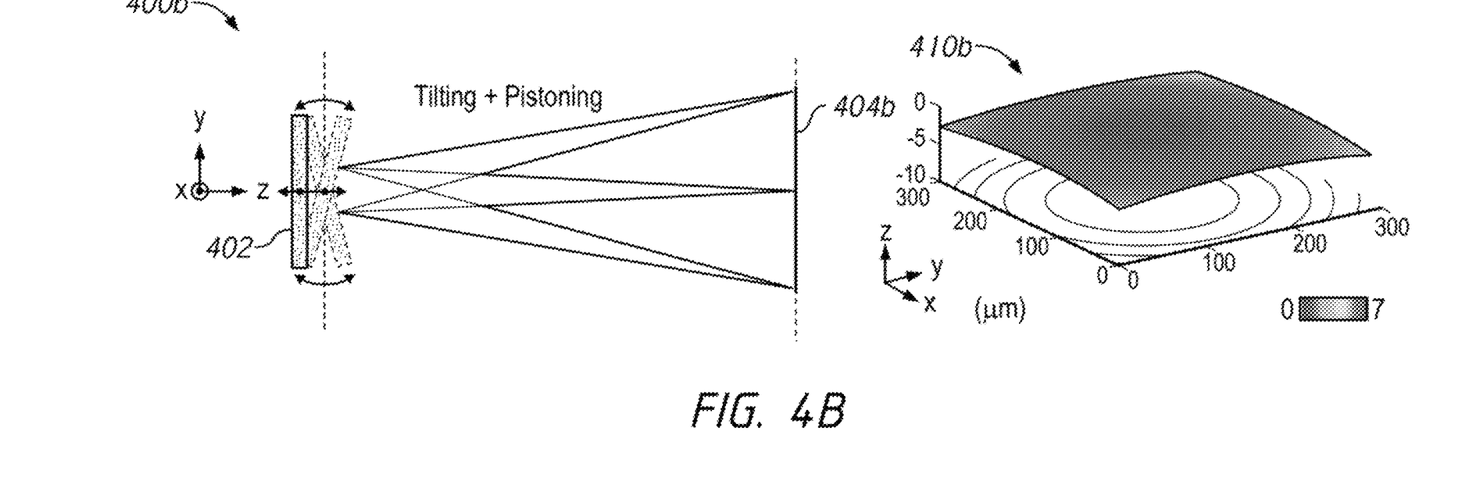

FIGS. 4A-4B are graphs depicting example operations of a scanning mirror according to some embodiments of the present disclosure. FIGS. 4A and 4B show different modes which may be used by a microscope, such as the microscope 102 of FIG. 1, 200 of FIG. 2, and/or 300 of FIG. 3 to achieve different shapes of focal region. In particular. FIGS. 4A and 4B represent a comparison of a scanning mode where only rotation of a scanning mirror 402 about an axis is used to scan a line focus across a focal surface 404a, and a mode where both rotation and translation (e.g., pistoning) of the mirror 402 is used to generate focal surface 404b. Graphs 410a and 410b illustrate the shape of the focal surfaces 404a and 404b respectively in more detail.

Schematic 400a of FIG. 4A shows an operational mode where the mirror 402 rotates about an axis, but does not piston, to generate a focal surface 404a. The focal surface 404a is curved (relative to a focal plane z0) due to the rotation of the mirror 402. In contrast, schematic 400a shows an operational mode where the mirror 402 both rotates (e.g., about the x-axis) and also translates along the z axis. These movements may be coordinated to generate a flat focal surface 404b.

As may be seen by comparing graphs 410a and 410b, the focal surface 404a has substantially increased curvature compared to the focal surface 404b. The focal surface 404b may, in some embodiments be substantially flat, whereas the focal surface 404a may not be. In some embodiments, the focal surface 404b may have a slight curvature caused by the inherent behavior of the lenses in the system. For example, the focal surface at the back focal plane of the objective (e.g., BFP of FIG. 2) may be flat, but the objective may generate some level of curvature at the front focal plane (e.g., FFP of FIG. 2). In some embodiments, the microscope may have optics designed to correct for this (e.g., a set of objectives, which accounts for the flat focal plane) and the focal surface 404b at the FFP may also be planar.

The focal surface 404b may have an amount of curvature which is smaller than a depth of focus of the focal surface 404b. In some embodiments, the focal surface 404b may have a curvature which is smaller than a thickness of an imaging target (e.g., may have a smaller curvature than a thickness of a tissue layer).

Figure 5:
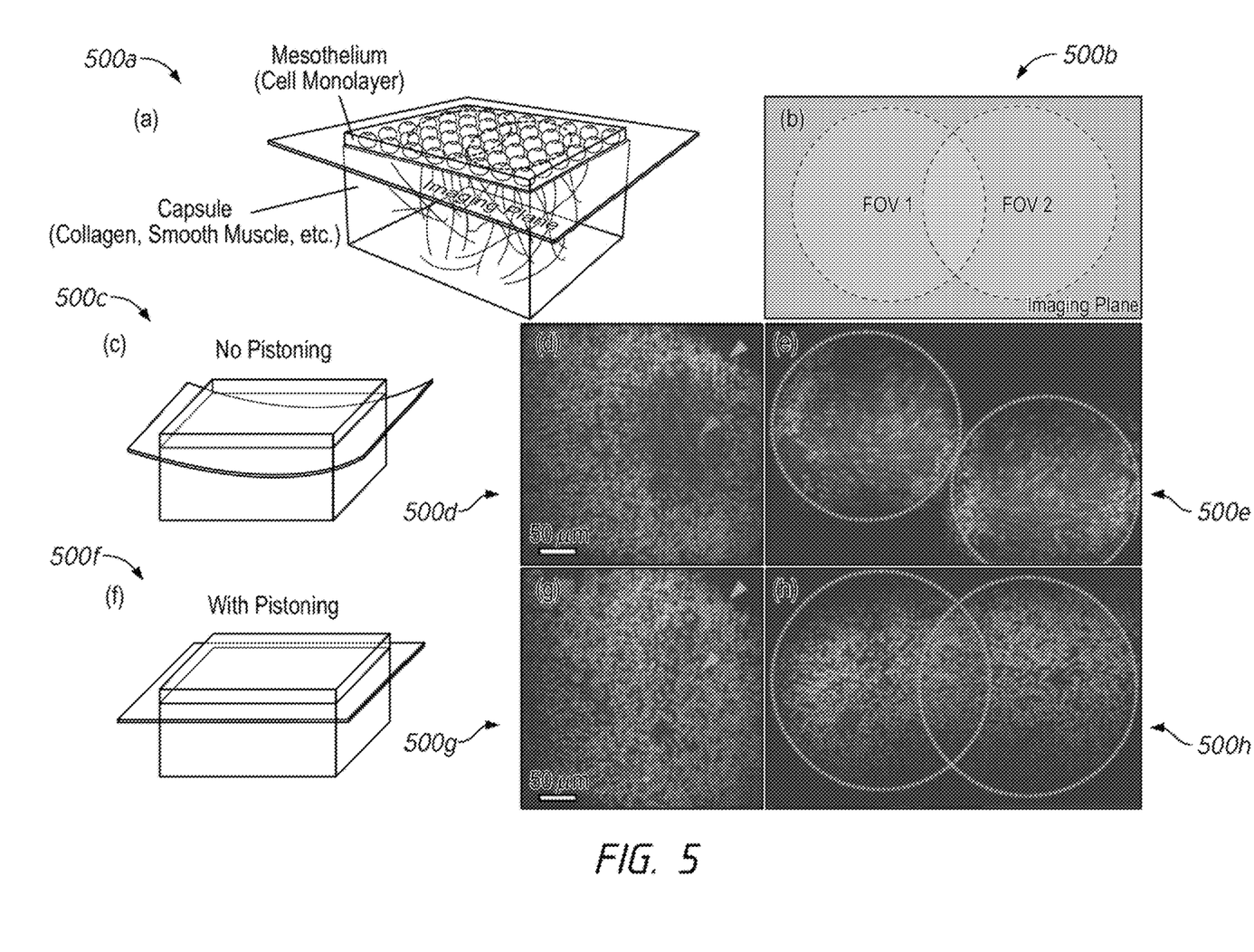
FIG. 5 is a set of schematics and images demonstrating an example operation of a microscope according to some embodiments of the present disclosure.

FIG. 5 is a set of schematics and images demonstrating an example operation of a microscope according to some embodiments of the present disclosure. In some embodiments, FIG. 5 may represent operations performed by, and images collected by, one or more of the microscopes described in FIGS. 1-4.

FIG. 5 illustrates the operation of a microscope in a first mode where a curved focal surface is generated and a second mode where a flat focal surface is generated, and compares operation in these modes to show the potential benefits of using a flat focal surface for imaging certain types of samples, such as tissues.

The schematic 500a shows an example piece of tissue (e.g., human tissue) which has a layer of mesothelium (e.g., a monolayer of cells) stacked on top of a capsule (e.g., which includes connective tissue, muscles, etc.). It may be desirable to image a large region of the mesothelium, which has a large lateral extent, but is relatively thin (e.g., since the mesothelium is generally a monolayer of cells). The schematic 500a shows an idealized imaging plane cutting through the mesothelium.

Schematic 500b shows a 'top-down' view of the imaging plane from the schematic 500a. The image plane of schematic 500b shows how multiple fields of view (FOVs) may be combined to allow for imaging of a larger area. Each FOV may represent an area scanned by the microscope. For example, the FOV may represent an area which can be imaged as the illumination beam is scanned back and forth (e.g., an area which can be imaged without moving the sample and microscope relative to each other, adjusting the optics to point to a different area, etc.). In order to image a wider area, mosaicking may be used to combine multiple fields of view. For example, a controller (e.g., computer 130 of FIG. 1) may automatically combine multiple FOVs by registering the images and finding areas of overlap between the FOVs. However, finding such areas of overlap may be difficult when the FOVs are curved (e.g., due to a curvature of the focal surface).

Schematic 500*c* shows an operational mode where the scanning element rotates, but does not translate (e.g., piston) and produces a curved focal surface. Images 500*d* and 500*e* show example images of tissue collected using the scanning mode of schematic 500*c*. Schematic 500*f* shows an operational mode where the scanning element both rotates and pistons to generate a generally flat focal surface. Images 500*g* and 500*h* show example images of tissue collected using the scanning mode of schematic 500*f*.

As may be seen by comparing image 500*d* to image 500*g*, the use of pistoning to generate a flat focal surface may improve the image quality. The curved focal surface of image 500*d* may dip into the capsule, and thus fail to capture the cellular structure of mesothelium in certain regions. Meanwhile, the flat focal surface of image 500*g* may stay within the monolayer of the mesothelium and produce more accurate images.

As may be seen by comparing the image 500*e* to the image 500*h*, a flat focal surface may also be useful for mosaicking. The curved surfaces of image 500*e* may tail to capture features which would have added in image registration. Thus the mosaicking of the image 500*e* fails. Meanwhile in the image 500*h*, overlapping features are found and the two FOVs are properly registered to each other to generate a mosaic.

Figure 6:
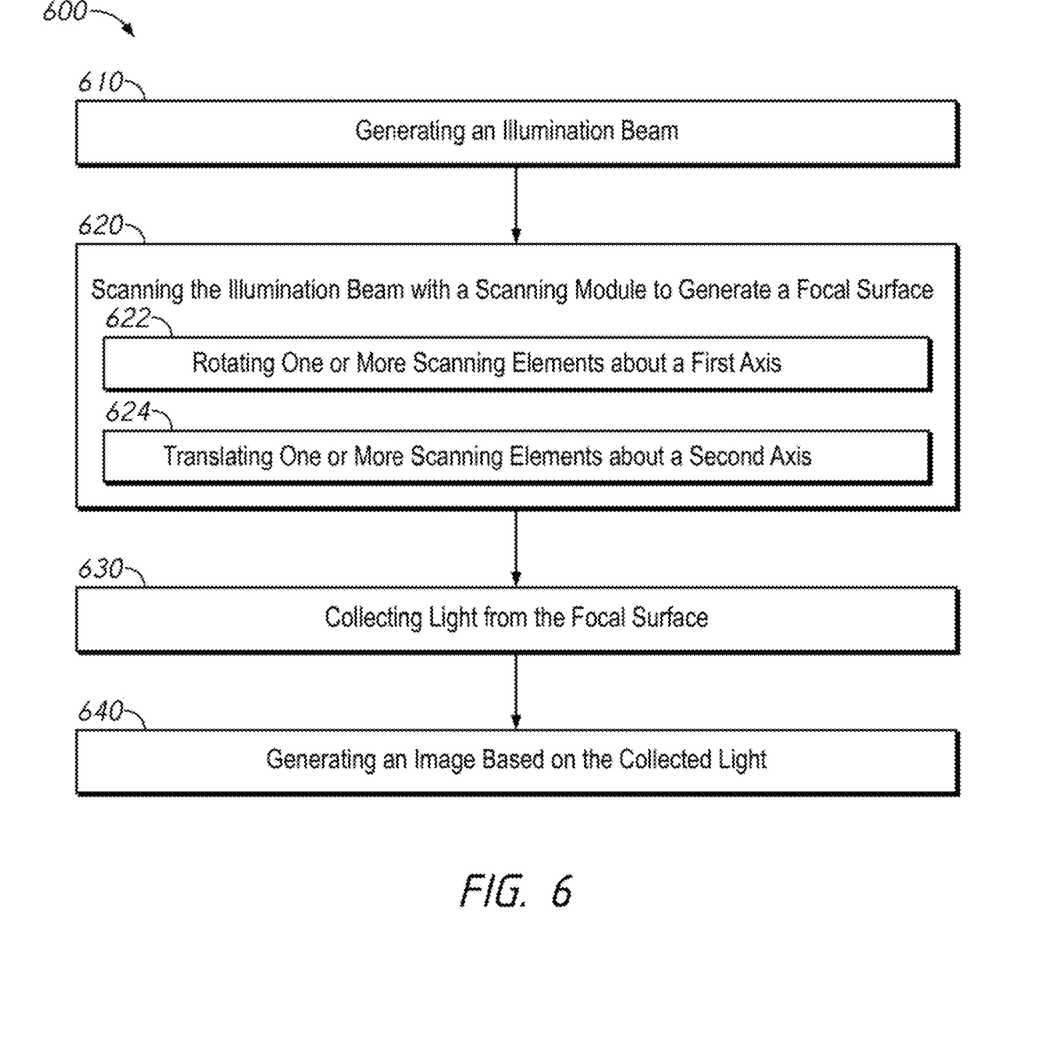
FIG. 6 is a flow chart of a method according to some embodiments of the present disclosure.

FIG. 6 is a flow chart of a method according to some embodiments of the present disclosure. The method 600 may, in some embodiments, be implemented by one or more of the microscopes or optical systems described in FIGS. 1-5.

The method 600 may generally begin with box 610, which describes generating an illumination beam. An illumination source (e.g., a laser) may generate illumination light. The illumination light may be directed through illumination optics to produce the illumination beam, in some embodiments, an optical fiber may couple the illumination light into the illumination optics. The illumination optics may change one or more properties (e.g., focus, wavelength, direction, etc.) of the illumination light to generate the illumination beam. In some embodiments, the illumination beam may have a line focus.

Box 610 may generally be followed by box 620, which describes scanning the illumination beam with a scanning module to generate a focal surface. For example, the illumination beam may be scanned across as BFP of an objective to generate the focal surface at a FFP of the objective. In some embodiments, the method 600 may include controlling the motion(s) of the scanning module to determine the shape of the focal surface.

Box 620 may include box 622, which describes rotating one or more scanning elements of the scanning module about a first axis and box 624 which describes translating one or more scanning elements about a second axis. The first and second axis may, in some embodiments be orthogonal to each other. In some embodiments, the first and second axis may be non-orthogonal. In some embodiments, additional axes of motion may be used. For example, in a point scan microscope, one or more scanning elements may rotate about a third axis. In some embodiments, various motions (e.g., rotation, translation) may be distributed among different ones of the scanning elements. In some embodiments, various motions may be combined into a scanning element. For example, in a point-scanned microscope, one scanning mirror may rotate about the first and third axis (e.g., an x and y axis) while a second scanning mirror may translate (e.g., piston) along the second axis (e.g., a z axis). In some embodiments, the motion of the scanning module may be controlled such that the focal surface is substantially flat (e.g., a flat-field). In some embodiments, the rotation and translation may be performed by different components or by a same component of the scanning element. For example, a MEMS mirror may perform both the rotation and the translation.

Box 620 may generally be followed by box 630, which describes collecting light from the focal surface. For example, light may be collected through the objective, and the scanning module may direct the collected light to collection optics. The scanning module may descan the collected light onto the collection optics. In some embodiments, the collection optics may alter one or more properties of the collected light (e.g., by filtering) before directing the collected light onto a detector In some embodiments, collected light from the objective may be directed to a set of descanning optics separate from the scanning module. The descanning optics may descan the collected light, for example with one or more scanning elements which may be synchronized with the scanning module.

Box 630 may generally be followed by box 640, which describes generating an image based on the collected light. For example, the detector may generate an image based on the collected light. The image may be presented to a user (e.g., on a display) and or saved.

In some embodiments, the method 600 may include positioning a hand-held unit which includes the scanning element near the sample. In some embodiments, the method 600 may include capturing multiple fields of view and mosaicking them together.

The example embodiments of the disclosure may be described with respect to a particular implementation or application, however other implementations or applications may also be used. For example, optical processes which were described with respect to lenses may be instead implemented with one or more curved mirrors, spectrums of illumination light described as narrowband sources may be substituted with broadband sources and filters, etc. Similarly, different layouts of the optical system may be used to alter the shape of the microscope to accommodate different constraints (e.g., a different shape of housing may require additional mirrors, fibers, and/or other components to reshape the optical path.

Various components and optical beams may be discussed herein with respect to their idealized behavior. For example, an illumination light sheet may be described as "flat" or "planar" to represent its idealized behavior, how ever it should be understood that such beams will in reality have a non-zero thickness and that the scanned surface may not be perfectly flat.

Of course, it is to be appreciated that any one of the examples, embodiments or processes described herein may be combined with one or more other examples, embodiments and or processes or be separated and/or performed amongst separate dev ices or dev ice portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A microscope comprising:
an illumination source configured to provide illumination light; illumination optics configured to generate an illumination beam based on the illumination light; a collection light path; a scanning module configured to scan the illumination beam to generate a focal surface, and configured to receive light from the focal surface and direct the received light to the collection light path, wherein the scanning module includes one or more scanning elements, and wherein the one or more scanning elements is configured to rotate about a first axis and translate along a second axis; and a detector configured to receive the received light from the collection light path.

2. The microscope of claim 1, wherein the one or more scanning elements are further configured to rotate about a third axis.

3. The microscope of claim 1, wherein the focal surface is a substantially flat field in a plane which is orthogonal to the second axis.

4. The microscope of claim 1, wherein the first axis is orthogonal to the second axis.

5. The microscope of claim 1, wherein the scanning element and the detector are contained by a hand-held housing.

6. The microscope of claim 1, wherein the illumination beam has a line focus.

7. The microscope of claim 6, wherein the detector is a linear array detector.

8. The microscope of claim 1, wherein the one or more scanning elements includes a micro-electromechanical (MEMS) mirror.

9. The microscope of claim 8, wherein the MEMS mirror is configured to perform the rotation about the first axis and the translation along the second axis.

10. The microscope of claim 1, further comprising a controller configured to direct the scanning element to determine a shape of the focal surface.

11. The microscope of claim 1, wherein the microscope is a confocal microscope, the apparatus further comprising a confocal aperture configured to limit out of focus light received at the detector.

12. The microscope of claim 11, wherein the illumination light includes an excitation wavelength of a fluorophore, wherein the received light includes light emitted from the fluorophore.

13. A system comprising:
a controller comprising:
an illumination source configured to generate illumination light; and
a scanning module controller configured to provide signals based on a selected shape of a focal surface; and
a microscope comprising:
an illumination light path configured to generate an illumination beam based on the illumination light;
a collection light path; and
a scanning module configured to scan the illumination beam to generate the focal surface, the scanning module further configured to receive light from the focal surface and direct the received light to the collection light path, wherein the scanning module includes one or more scanning elements configured to actuate based on the signals, and wherein the one or more scanning elements are configured to rotate about a first axis and translate along a second axis.

14. The system of claim 13, wherein the microscope further comprises a detector configured to generate an image based on the light received by the collection light path.

15. The system of claim 13, wherein the shape of the focal surface is substantially flat.

16. The system of claim 13, wherein the shape of the focal surface is arbitrary.

17. The system of claim 13, wherein the one or more scanning elements includes a micro-electromechanical system (MEMS) scanning mirror configured to perform the rotation about the first axis and the translation about the second axis.

18. The system of claim 13, wherein the illumination beam has a line focus.

19. The system of claim 13, wherein the collection light path includes a confocal aperture.

20. The system of claim 13, wherein the controller is positioned on a mobile platform.

21. The system of claim 13, wherein the microscope is portable.

22. The system of claim 13, wherein the one or more scanning elements are configured to rotate about a third axis.

23. A method of performing microscopy comprising:
generating an illumination beam based on illumination light from an illumination source;
scanning the illumination beam with a scanning module to generate a focal surface, wherein the scanning module includes one or more scanning elements, and wherein the scanning includes rotating at least one of the one or more scanning elements about a first axis and translating at least one of the one or more scanning elements along a second axis;
collecting light from the focal surface with the scanning module and directing the collected light to a detector with a collection light path; and
generating an image based on the collected light at the detector.

24. The method of claim 23, wherein the scanning module includes a micro-electromechanical system (MEMS) mirror which performs the rotation about the first axis and the translation about the second axis.

25. The method of claim 23, further comprising positioning a hand-held unit including the scanning module near a sample.

26. The method of claim 23, further comprising controlling the motions of the scanning module to determine a shape of the focal surface.

27. The method of claim 23, further comprising scanning the illumination beam to generate a focal surface which is substantially flat.

28. The method of claim 23, wherein generating the illumination beam comprises focusing illumination light into a line focus.

29. The method of claim 23, wherein the scanning further includes rotating at least one of the one or more scanning elements about a third axis.

* * * * *